Dec. 31, 1929.                M. F. DESMOND                1,741,682
                    SANDWICH BREAD SLICE CUTTER MOLD
                         Filed June 5, 1928
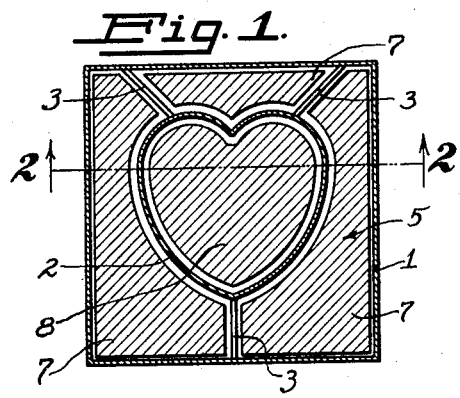
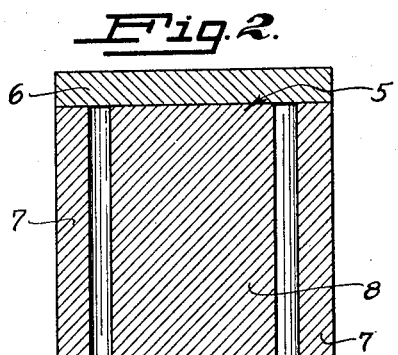
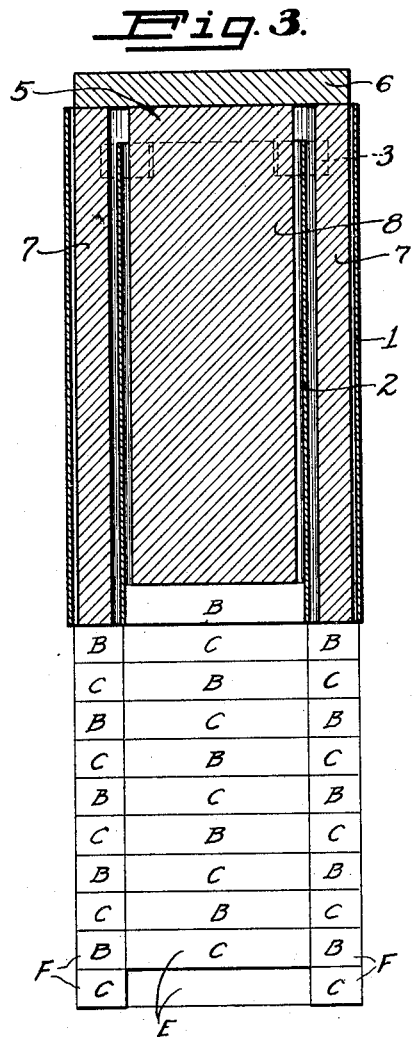
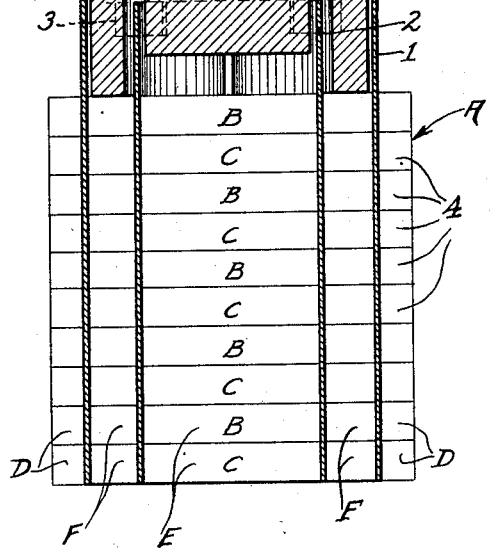
INVENTOR.
Matthew F. Desmond
BY Harry A. Totten
ATTORNEY.

Patented Dec. 31, 1929

1,741,682

UNITED STATES PATENT OFFICE

MATTHEW F. DESMOND, OF BURLINGAME, CALIFORNIA

SANDWICH-BREAD SLICE-CUTTER MOLD

Application filed June 5, 1928. Serial No. 283,086.

This invention relates to cutting devices or pattern molds designed primarily for cutting designs from sheets or slices of material.

The invention is designed primarily for culinary purposes, and more particularly in the making of dainty sandwiches or composite pastry or bread slices. It may be also used in preparing vegetables for salads and the like.

The invention consists broadly in a cutting mold formed to provide one pattern within another, the mold being of elongated structure to retain the successive cut slices therein and an expeller or ejector insertable into the mold from one end and movable longitudinally thereof for advancing all of the designs of one pattern a predetermined distance in advance of the other during the expelling of the designs from the mold.

The invention has for its principal object to provide an implement by which slices of bread may be cut or fashioned quickly and economically to provide patterns or portions of different color or kind, interfitted to constitute a complete slice. This is true of vegetables and of pastry slices, and enables the provision of a slice consisting of a number of different component parts interfitting and arranged to present a picturesque structure.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawing, wherein—

Figure 1 is a transverse sectional view through the cutting mold and expeller, illustrating one form of the cutting mold design.

Figure 2 is a view in vertical section of the cutting mold in position after being forced through a stack of slices and with the expelling plunger in position for its initial operation, taken on the line 2—2 of Fig. 1.

Figure 3 is a view similar to Figure 2, with the expelling plunger in a position after having expelled the slices successively from the cutting mold, and having advanced corresponding portions of the slices ahead of other portions of the same slices.

In describing the illustrated or preferred embodiment of my invention, reference is made to the several views of the drawings, wherein like characters of reference designate corresponding parts, and 1 indicates the outer rectangular frame of a tubular cutting mold, open at its opposite ends. Within the mold, with its wall disposed longitudinally of the mold wall, is an open ended tubular wall 2 forming a pattern design. The wall 2 at one end of the cutting mold is supported in spaced relation to the wall 1 by supporting or brace members 3, in the present instance being three in number.

In operation, the user provides a vertical stack A of slices 4, for descriptive purposes of the present invention we will assume that they are of bread. The slices 4 in their vertical stack, as illustrated in Fig. 2, are alternately white bread B, and graham bread C; this arrangement being used because the slices of these two breads differ in color. In stack formation A, the operator forces the cutting mold 1 downwardly through the stack of bread, trimming, in this particular case, the crust D from each slice, and cutting a design E in the center of a continuous frame F. The slices in this formation, as illustrated in Fig. 2, are frictionally held within the mold 1.

To cooperate with the mold 1 there is provided an expeller 5 having a head or supporting piece 6 which mounts expelling core members 7 and 8, the former in cross section being of a design to fill the mold space surrounding the wall 2, and the latter of a cross sectional configuration to fill the design of the center mold, in this particular instance it being heart shaped.

The core members 7 are slotted longitudinally to accommodate the passage of the brace members 3 longitudinally thereof when the expeller is operated to force the slices from the mold.

It will be observed from Figs. 2 and 3 of the drawings that the end of the core member 8 falls short of extending to the end of the core member 7, the difference in length in this particular embodiment of the invention corresponding to the thickness of one of the bread slices. While the center member in this embodiment is illustrated as being the shortest of the two, it is to be understood that, if desired, the outer member may be the shorter, the essence of the invention being that one of the core members is shorter than the other, the difference being approximately the thickness of a slice.

With the mold forced downwardly through the stack of slices A, Fig. 2, and with the slices in their cut configuration, held within the mold by frictional contact, the expeller 5 is positioned in the upper end of the mold, Fig. 2, with the free end of the core members 7 resting on the portion of the uppermost slice surrounding the tubular wall 2, forming a heart shaped central design.

With one hand the operator grasps the upper portion of the mold and raises its lower end a slight distance above a support or table, not shown, with the support or table parallel with the lowermost slice. With the other hand, the operator grasps the upper end of the expeller and imparts a relatively telescoping action to the mold and expeller. The first operation is for the lower end of the outer core member 7 to advance the cut portions of the slices longitudinally of the mold space surrounding the wall 2, which in the present instance corresponds to the thickness of a slice prior to the time the central core member 8 contacts with the heart shaped design of the uppermost slice within the wall 2. The first action is to discharge the frame F of the lowermost slice from the bottom of the mold and to advance the frames F of successive slices to a position in alignment with the center design E of the slice originally below the advanced frame slice.

After this operation, it will be observed that each slice center design E is surrounded by a frame F of a different color and kind of bread. These composite slices are then expelled successively from the mold until such time as the uppermost center design E is discharged, this operation taking place without the design being surrounded by a frame. The operator takes this design and in any suitable manner positions it within the first frame initially discharged from the mold.

By my improved apparatus it will be understood that many combinations of material, in a composite slice, may be provided.

I claim:—

In combination, a plurality of tubular elongated molds open at their opposite ends positioned one within the other and formed at corresponding ends with cutting edges, and an expelling plunger of the configuration of each mold for insertion thereinto from one end to expel the material therein from the other end, the ejecting end of the plunger for one mold projecting beyond the end of the plunger for another mold, and means permanently uniting said plungers in fixed relation to cause their operation in unison.

In testimony whereof I have signed my name to this specification.

MATTHEW F. DESMOND.